(No Model.)
T. PRIESHOFF.
HAND PLANTER OR DIBBLER.
No. 467,433.　　　　　　　　Patented Jan. 19, 1892.
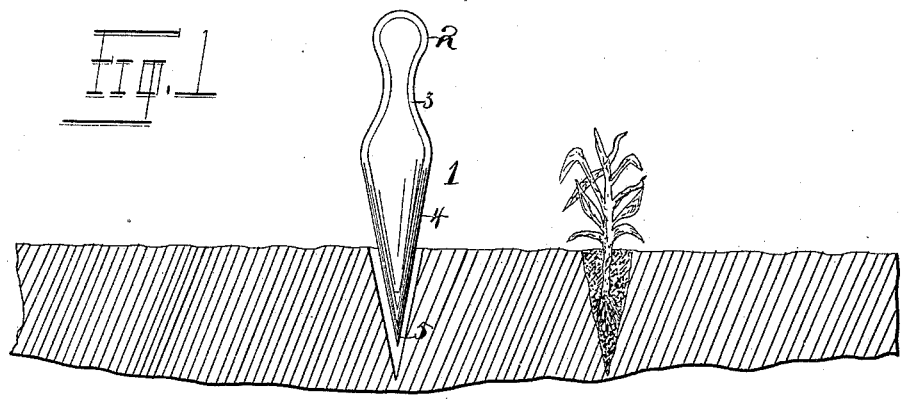
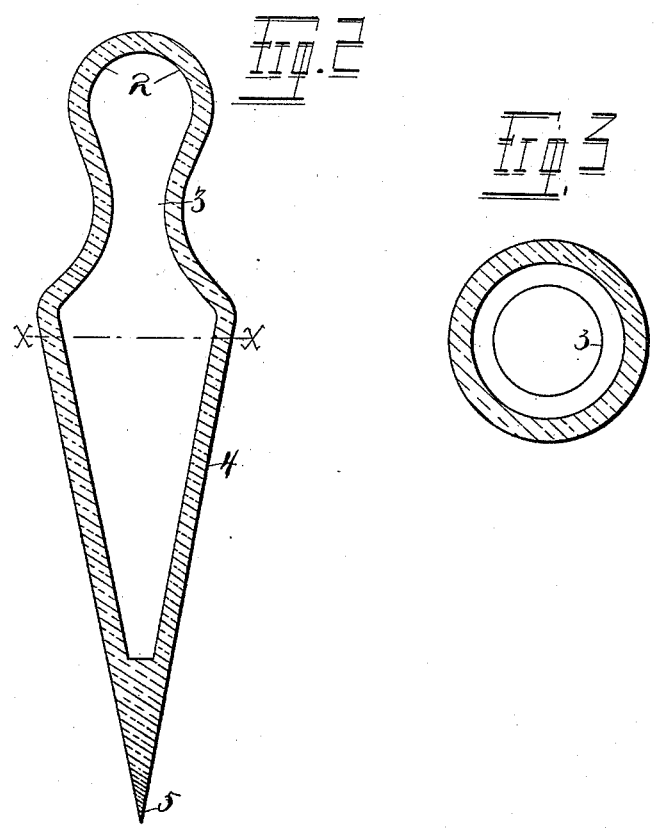
Witnesses
A. A. Eicke
Ed. E. Langan
Theodore Prieshoff Inventor
By his Attorneys Higdon & Higdon

UNITED STATES PATENT OFFICE.

THEODORE PRIESHOFF, OF ST. LOUIS, MISSOURI.

HAND PLANTER OR DIBBLER.

SPECIFICATION forming part of Letters Patent No. 467,433, dated January 19, 1892.

Application filed November 2, 1891. Serial No. 410,560. (No model.)

*To all whom it may concern:*

Be it known that I, THEODORE PRIESHOFF, of the city of St. Louis and State of Missouri, have invented certain new and useful Improvements in Hand-Planters, of which the following is a full, clear, and exact description, reference being had to the accompanying drawings, forming a part hereof.

My invention relates to improvements in "hand planters" or dibblers; and it consists in the novel arrangement and combination of parts, as will be more fully hereinafter described, and designated in the claim.

In the drawings, Figure 1 is a side elevation of my invention, showing the application of the same when in use. Fig. 2 is a longitudinal section of the same. Fig. 3 is a cross-section taken on the line $x$ $x$ of Fig. 2.

The object of my invention is to construct a hand planter or dibbler for planting seeds, plants, &c., the same being constructed of such material as will never corrode or tarnish, thereby preventing dirt from adhering to the same when in use.

I have found by experiment that the best material to accomplish the aforesaid results is glass, and out of said material I desire to make my device.

Referring to the drawings, 1 indicates my invention, which comprises a cylindrical head or portion 2, adapted for a hand-hold, with a hollowed-out portion 3, with a tapering conical portion 4, and an attenuated point 5.

In the manufacture of my invention I desire to have the attenuated portion 5 made solid, as shown in the drawings, the tapering conical portion 4, the hollowed-out portion 3, and cylindrical knob 2 made hollow; or I may construct the entire tool solid. I desire to state in this connection that the cylindrical knob or head 2 may be provided with an opening, (which is not illustrated,) or may be closed, as illustrated in the drawings. However, I presume that the same is more readily blown by leaving an opening in said head 2.

By making my invention out of glass I have found by experiment that the same never corrodes or rusts and that no dirt ever adheres to the same when used. I also desire to leave the glass transparent, as it is presumed that transparent glass has a more highly-polished surface than ground glass, and consequently the dirt is not as liable to adhere to the same.

Fig. 1 fully illustrates the use of my invention, and it would be superfluous on the part of the applicant to give a further description or elucidation relating thereto.

Having fully described my invention, what I claim is—

As a new article of manufacture, a hand planter or dibbler of glass, comprising a tapering conical portion 4, a point 5, a hollowed-out portion 3, and a cylindrical head or portion surmounting said hollowed-out portion, substantially as set forth.

In testimony whereof I affix my signature in presence of two witnesses.

THEODORE PRIESHOFF.

Witnesses:
ED. E. LONGAN,
O. F. KELLER.